(12) United States Patent
Metzger

(10) Patent No.: US 11,761,173 B2
(45) Date of Patent: Sep. 19, 2023

(54) SYSTEMS AND METHODS FOR BUILDING A PAD

(71) Applicant: Caterpillar Inc., Deerfield, IL (US)

(72) Inventor: Tony Metzger, Congerville, IL (US)

(73) Assignee: Caterpillar Inc., Peoria, IL (US)

( * ) Notice: Subject to any disclaimer, the term of this patent is extended or adjusted under 35 U.S.C. 154(b) by 721 days.

(21) Appl. No.: 16/018,801

(22) Filed: Jun. 26, 2018

(65) Prior Publication Data
US 2019/0390442 A1   Dec. 26, 2019

(51) Int. Cl.
*E02F 9/20* (2006.01)
*E02F 9/26* (2006.01)
*G05D 1/02* (2020.01)
*G01S 19/14* (2010.01)

(52) U.S. Cl.
CPC .......... *E02F 9/2045* (2013.01); *E02F 9/2037* (2013.01); *E02F 9/262* (2013.01); *G05D 1/0257* (2013.01); *G05D 1/0274* (2013.01); *G05D 1/0278* (2013.01); *G01S 19/14* (2013.01); *G05D 1/0236* (2013.01); *G05D 2201/0202* (2013.01)

(58) Field of Classification Search
CPC ....... E02F 9/2045; E02F 9/2037; E02F 9/262; G05D 1/0274; G05D 1/0257; G05D 1/0278; G05D 2201/0202; G05D 1/0236; G05D 1/0251; G01S 19/14
USPC ........................................................ 701/431
See application file for complete search history.

(56) References Cited

U.S. PATENT DOCUMENTS

| 4,807,131 A | 2/1989 | Clegg |
| 5,375,663 A | 12/1994 | Teach |
| 5,631,658 A | 5/1997 | Gudat et al. |
| 6,047,227 A | 4/2000 | Henderson |

(Continued)

FOREIGN PATENT DOCUMENTS

| CN | 1117317 A | 2/1996 |
| CN | 1957145 B | 7/2010 |

(Continued)

OTHER PUBLICATIONS

Chinese Office Action for Int'l. Patent Appln. No. 201910554525.2, dated Sep. 21, 2022 (2 pgs).

(Continued)

*Primary Examiner* — Maceeh Anwari
(74) *Attorney, Agent, or Firm* — Bookoff McAndrews, PLLC

(57) ABSTRACT

A method for building a pad at a construction site using a geography-altering machine, the method comprising: receiving a design for the pad at the geography-altering machine, receiving a terrain surface model of the construction site at the geography-altering machine, wherein the terrain surface model is generated using an imaging device located on the geography-altering machine, generating a cut-and-fill map at the geography-altering machine based on the design for the pad and the terrain surface model, generating guidance for building the pad at the geography-altering machine, wherein the guidance includes a starting location and moving directions for the geography-altering machine, monitoring process of building the pad using the imaging device on the geography-altering machine; and updating the cut-and-fill map and the guidance based on the monitored process.

20 Claims, 5 Drawing Sheets

(56) References Cited

U.S. PATENT DOCUMENTS

| | | | |
|---|---|---|---|
| 7,857,071 B1 | 12/2010 | McCain et al. | |
| 8,620,535 B2 | 12/2013 | Friend et al. | |
| 8,788,440 B2 | 7/2014 | Williams et al. | |
| 9,234,329 B2* | 1/2016 | Jaliwala | E02F 3/847 |
| 9,428,885 B2 | 8/2016 | Nau | |
| 9,822,509 B1 | 11/2017 | Chi et al. | |
| 2004/0210370 A1 | 10/2004 | Gudat | |
| 2016/0076222 A1 | 3/2016 | Taylor et al. | |
| 2016/0193920 A1 | 7/2016 | Tsubone et al. | |
| 2018/0202128 A1* | 7/2018 | Kurakane | E02F 9/2025 |
| 2018/0355587 A1* | 12/2018 | Hashimoto | E02F 9/2045 |

FOREIGN PATENT DOCUMENTS

| | | |
|---|---|---|
| CN | 101946250 B | 5/2014 |
| CN | 103938671 A | 7/2014 |
| CN | 102016629 B | 4/2017 |
| CN | 106894455 A | 6/2017 |
| CN | 107794967 A | 3/2018 |
| CN | 107870622 A | 4/2018 |
| JP | 2001098585 A | 4/2001 |
| JP | 2002328022 A | 11/2002 |
| JP | 2016106192 A | 6/2016 |
| WO | 2018228669 A1 | 12/2018 |

OTHER PUBLICATIONS

Chinese Office Action Search Report for Int'l. Patent Appln. No. 201910554525.2, dated Jun. 14, 2022 (2 pgs).

* cited by examiner

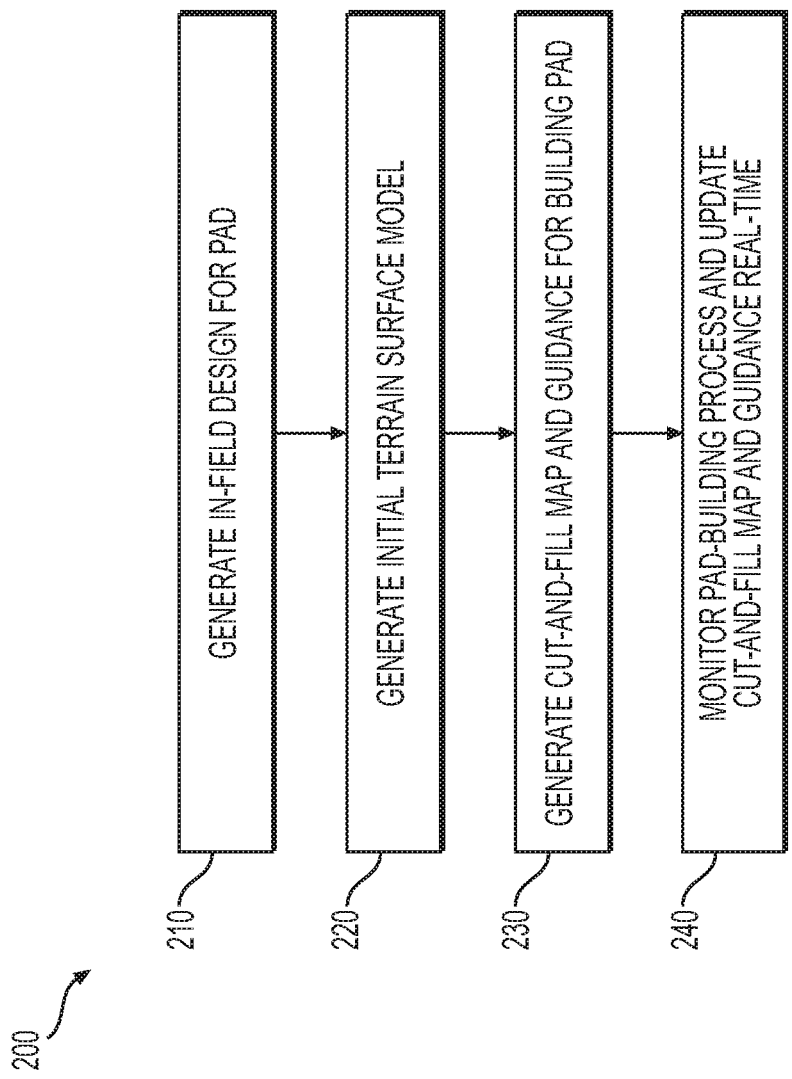

SYSTEMS AND METHODS FOR BUILDING A PAD

TECHNICAL FIELD

The present disclosure relates generally to systems and methods for building a pad at a construction site using a geography-altering machine.

BACKGROUND

A common application for track-type tractors (TTT) is building pads (e.g., oil pads, building pads, residential pads, etc.) at construction sites. Current methods rely on the operator's experience to determine the amount and the location of material cutting and filling. These methods can be time-consuming and labor-intensive. For example, the operator is often required to get on and off the tractor with grade rods or other instruments to check grade for the pad. This could result in productivity losses and potential injuries. Thus, there is a need for automated methods and systems for building pads using track-type tractors or similar machines.

U.S. Pat. No. 5,631,658 ("the '658 patent") discloses methods and systems for operating geography-altering machines. The methods and systems in the '658 patent direct the machine to bring the actual site geography into conformity with the desired site geography based on digital three-dimensional models. However, the '658 patent fails to disclose any methods or systems for automating the pad-building process by providing real-time guidance to the operator of the machine. The systems and methods of the present disclosure may solve one or more of the problems set forth above and/or other problems in the art. The scope of the current disclosure, however, is defined by the attached claims, and not by the ability to solve any specific problem.

SUMMARY OF THE DISCLOSURE

In one aspect, a method for building a pad at a construction site using a geography-altering machine includes receiving a design for the pad at the geography-altering machine, receiving a terrain surface model of the construction site at the geography-altering machine, wherein the terrain surface model is generated using an imaging device located on the geography-altering machine, generating a cut-and-fill map at the geography-altering machine based on the design for the pad and the terrain surface model, generating guidance for building the pad at the geography-altering machine, wherein the guidance includes a starting location and moving directions for the geography-altering machine, monitoring process of building the pad using the imaging device on the geography-altering machine; and updating the cut-and-fill map and the guidance based on the monitored process.

In another aspect, a method of building a pad at a construction site using a geography-altering machine includes receiving a design for the pad and a terrain surface model of the construction site in a controller on the geography-altering machine, wherein the terrain surface model is received from an imaging device on the geography-altering machine, generating a cut-and-fill map based on the design for the pad and the terrain surface model by the controller, and generating guidance, by the controller, for building the pad, the guidance including a starting location and moving directions for the geography altering machine.

In yet another aspect, a geography-altering machine for building a pad at a construction site includes an imaging device, and a controller, wherein the controller is configured to receive a design for a pad, receive a terrain surface model of the construction site, generate a cut-and-fill map based on the design for the pad and the terrain surface model, generate guidance for building the pad, wherein the guidance is generated by a controller on the geography-altering machine and includes a starting location and moving directions for the geography-altering machine, and monitor process of building the pad using the imaging device on the geography-altering machine, and update the cut-and-fill map and the guidance based on the monitored process.

BRIEF DESCRIPTION OF THE DRAWINGS

FIGS. 2A and 2B are flowcharts that illustrate exemplary methods for building a pad at a construction site.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," substantially," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

Figure 1:
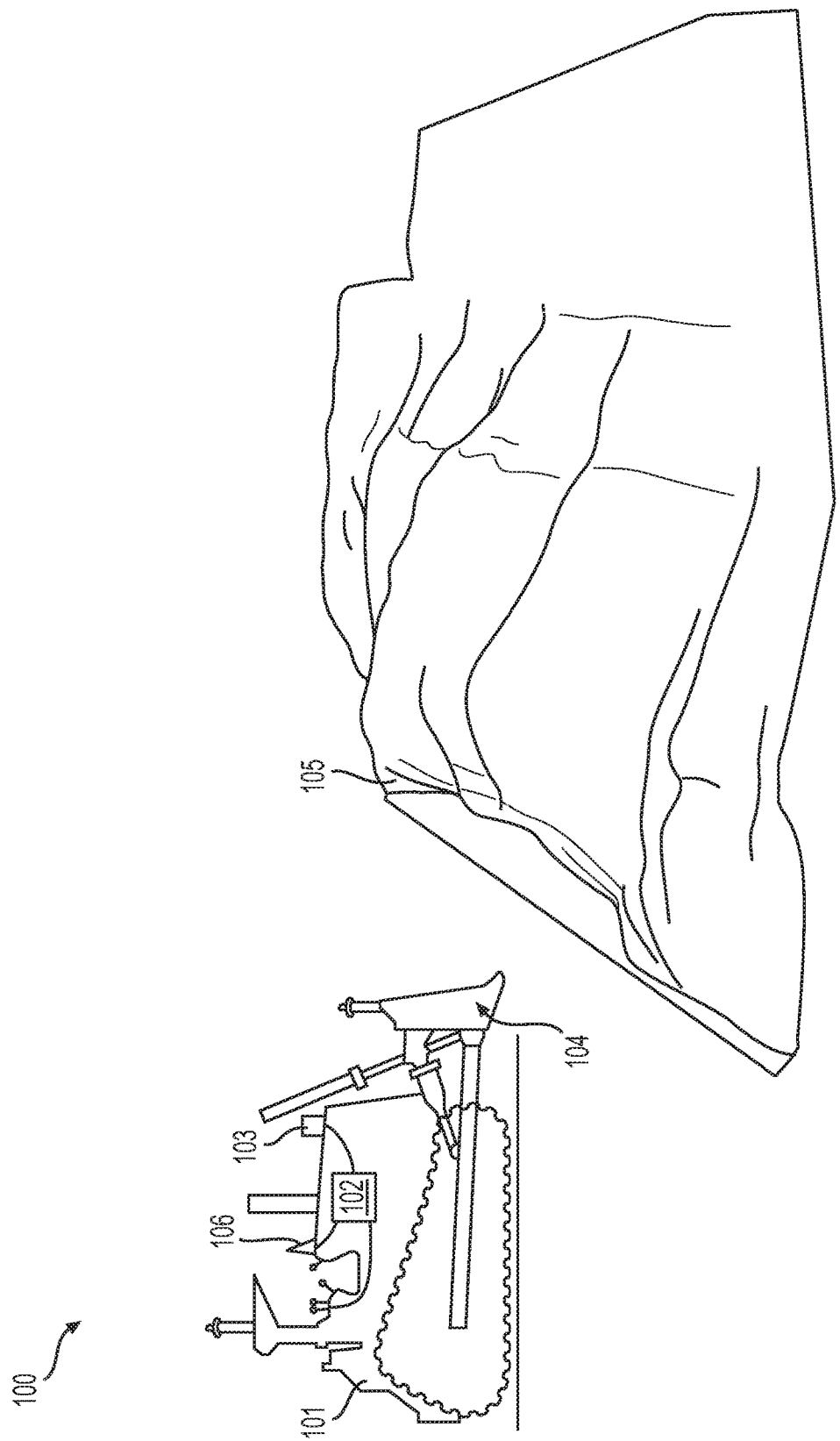
FIG. 1 is a schematic representation of an exemplary system for building a pad at a construction site.

FIG. 1 illustrates an exemplary system 100 for building a pad at a construction site 105 using a machine 101 (e.g., a geography-altering machine). As used herein, building a pad refers to re-shaping the topography of a plot of land by filling and/or cutting materials on the surface of the plot of the land. As will be explained in detail below, system 100 may assist an operator to build the pad via an automated process using on-board technology on machine 101. System 100 may include one or more of: the machine 101, a controller 102, an imaging device 103, an implement system 104, the construction site 105, and a display device 106. In general, controller 102 may use image data obtained from imaging device 103 to generate real-time guidance for the operator regarding the location of machine 101, the driving directions, amount of materials to load on machine 101, and the progress of the pad-building project.

Machine 101 may be any type of geography-altering machine. A geography-altering machine may include self-propelled mobile machines such as track-type tractors, dozers, backhoe loaders, compact loaders, wheel loaders, excavators, motor graders, etc. As shown in FIG. 1, the exemplary machine 101 described below will be a track-type tractor. Machine 101 may include any appropriate and conventional control system including operator interfaces and electronic components. For example, machine 101 may include appropriate electronic processors/controllers, sensors, memory, communications systems, and/or user interfaces.

Controller 102 may include any appropriate hardware and software, e.g., one or more processors, memory, communication systems, and/or other appropriate hardware. The processors may be, for example, a single- or multi-core processor, a digital signal processor, microcontroller, a general purpose central processing unit (CPU), and/or other conventional processor or processing/controlling circuit or controller. The memory may include, for example, read-only memory (ROM), random access memory (RAM), flash or other removable memory, or any other appropriate and conventional memory. The communication systems used in the components of system 100 may include, for example, any conventional wired and/or wireless communication systems such as Ethernet, BLUETOOTH, and/or wireless local area network (WLAN) type systems. Further, the communication systems may include a user interface adapter for connecting input devices such as a keyboard, a mouse, a touch screen, a voice input, and/or other devices, a communications adapter for connecting controller 102 to a network, a display adapter for connecting controller 102 to a display, etc. For example, the display may be used to display the three-dimensional terrain surface model, the design for the pad, and/or any images generated during monitoring the process of the pad-building process.

Figure 2B:
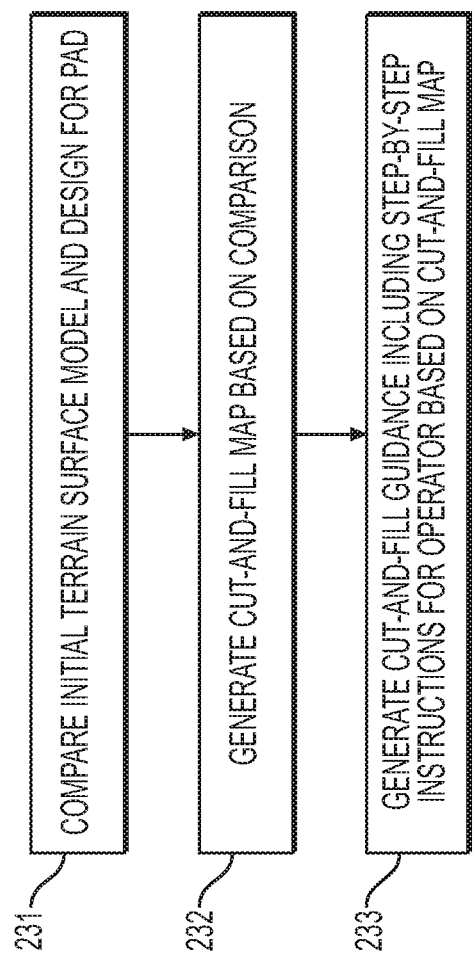
Figure 3:
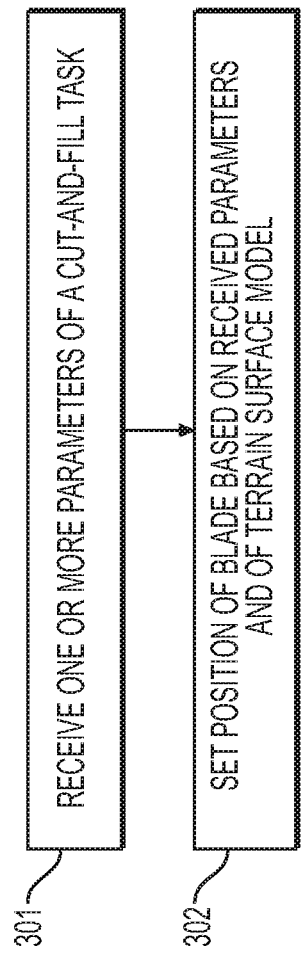
FIG. 3 is a flowchart that illustrates an exemplary method for setting the position of an implement system of a geography-altering machine in a pad-building process.

The software associated with the components of system 100 may include any appropriate software, programs, and/or applications for providing the functions provided in this disclosure (e.g., the functions of FIGS. 2A, 2B, and 3). Such software may be stored on controller 102 or at another location on machine 101, or could be stored remotely from machine 101 and accessible from machine 101. The components of system 100 may further include one or more data storage devices storing instructions for performing the methods herein, a non-transitory computer readable medium for use on a computer system containing computer-executable programing instructions for performing the methods herein, and/or a processor configured to execute the instructions.

Controller 102 may be configured to receive and analyze image data on construction site 105 from imaging device 103. With the image data, controller 102 may generate guidance for the operator on the pad-building project. In some cases, controller 102 may also be configured to control components of machine 101, e.g., implement system 104, based on parameters entered by the operator.

Imaging device 103 may be configured to generate image data on construction site 105. The image data may be three-dimensional data. Imaging device 103 may be a geodetic measuring device or a camera such as a stereo camera. Alternatively or additionally, imaging device 103 may include 3-dimensional laser, radar, or a global positioning system for generating image data on construction site 105. In some cases, imaging device 103 may be on machine 101, as shown in FIG. 1. For example, imaging device 103 may be a camera (e.g., a stereo camera) mounted on the front of machine 101. Alternatively or additionally, imaging device 103 may be an off-board device. For example, imaging device 103 may be a camera on a drone flying above construction site 105. The image data generated by imaging device 103 may be sent to controller 102 through a wired or wireless connection. In some cases, imaging device 103 may be configured to generate real-time image data while machine 101 is moving on or by construction site 105. In some cases, imaging device 103 may be connected or a part of a global positioning system (GPS) device, e.g., a high-precision GPS device. Such an imaging device may generate image data in GPS space.

Implement system 104 may be configured to perform cutting and/or filling tasks for building the pad. Implement system 104 may include one or more of a blade, a bucket, a spread, or a plow. For example, implement system 104 may be a blade on a track-type tractor.

FIG. 2A is a flow chart that illustrates an exemplary method 200 for building a pad, such as an oil pad, a building pad, a residential pad, etc. The method may be performed by system 100 illustrated in FIG. 1. Step 210 may include generating a design for the pad. The design may include one or more characteristics of the pad such as boundary locations, locations of the corners, slopes of one or more portions, locations of rigs, and/or dimensions of the pad. In some cases, the design may be an in-field design generated on construction site 105. The design for the pad may be generated by a component (e.g., controller 102) of machine 101 on construction site 105. Alternatively or additionally, the design for the pad may be generated before the project or by an off-board device. In some cases, step 210 may also include receiving the design for the pad, e.g., by a component, such as controller 102, of machine 101. One or more steps of the method 200 may be performed automatically. In some cases, all steps in method 200 may be performed by one or more components on machine 101.

Step 220 may include generating a terrain surface model of construction site 105. The terrain surface model may be generated using imaging device 103, e.g., using a stereo camera on a front of machine 101. The terrain surface model may include the characteristics (e.g., area, heights, shape, etc.) of construction site 105. Step 220 may also include receiving the terrain surface, e.g., by a component, such as controller 102, of machine 101. In some cases, the terrain surface model may be generated from machine 101 moving over construction site 105. In some cases, the terrain surface model may be entered into controller 102 on machine 101 (e.g. through a one or more queries), or downloaded onto controller 102.

Step 230 may include generating a cut-and-fill map for building the pad. The cut-and-fill map may be generated based on the comparison between the design for the pad and the terrain surface model. The cut-and-fill map may allow the pad to be built using existing materials at construction site 105. For example, the cut-and-fill map may be generated by balancing the terrain surface to achieve the design for the pad.

Step 230 may further include generating guidance for the operator of machine 101 for building the pad. The guidance may include information on the start location, moving directions, routes of the passes, types and amount of materials loaded on machine 101 for each pass, cut and/or fill locations and volumes, the progress of the pad-building project, or any combination thereof.

Step 230 may also include presenting the guidance to the operator of machine 101. The guidance may be presented on a user interface on display device 106. The display device 106 may be on machine 101. Alternatively or additionally, display device 106 may be on a portable device.

FIG. 2B shows an exemplary method for generating the cut-and-fill map and the guidance. Step 231 may include comparing the initial terrain surface model and the design for the pad. The comparison may be performed by controller 102 using one or more algorithms. The comparison may determine features to be included in the cut-and-fill map. Such features may include locations, sizes, and volumes of cut-and-fill tasks needed for building the pad on the terrain. Step 232 may include generating the cut-and-fill map based on the comparison, e.g., using the features determined from the comparison. Step 233 may include generating the guidance for the operator based on the cut-and-fill map. The guidance may provide step-by-step instructions to the operator on how to perform the pad-building project.

Referring back to FIG. 2A, step 240 may include monitoring the process of the pad-building project. The process may include percent completion of the project determined by the area of the pad completed, and/or amount of materials filled and/or cut. The monitoring may be performed using an on-board device, such as imaging device 103 (e.g., a stereo camera) and/or controller 102. Alternatively or additionally, the monitoring may be performed using an off-board device, e.g., a camera above construction site 105. The monitoring may be performed real-time.

Step 240 may further include updating the cut-and-fill map and/or the guidance based on the monitored pad-building process. For example, the cut-and-fill map and the guidance may be updated so that it provides real-time directions on the next step. The update may be performed using an on-board optimization algorithm.

FIG. 3 shows an exemplary method 300 for controlling implement system 104 for various cut-and-fill tasks. Method 300 may be performed using information from the cut-and-fill map generated in step 230. Step 301 may include receiving one or more parameters of a cut-and-fill task from controller 102. The parameter(s) may be entered to controller 102 by a user (e.g., the operator of machine 101). In some cases, the parameter(s) may be extracted or relayed from the cut-and-fill map by controller 102. For example, the parameter(s) may include the thickness of a portion of the pad. The thickness may be a layer or lift thickness. For example, when materials are moved into a fill region on construction site 105, a desired layer thickness may be used to achieve adequate compaction of materials. In some cases, the parameters may be extracted and implemented automatically, thus providing an autonomous functionality.

Step 302 may include determining and/or setting the position of one or more components of implement 104 by controller 102. For example, when machine 101 is a track-type tractor, step 302 may include setting the height of a blade of the tractor. The position may be determined based on the terrain in front of machine 101 and the one or more parameters received by controller 102. For example, the operator may enter the desired layer thickness of the portion of the pad, e.g., before the cut-and-fill map is generated. Based on the desired layer thickness and the corresponding portion of the terrain, the height of the blade may be set for building the portion of the pad to achieve this thickness.

Figure 4:
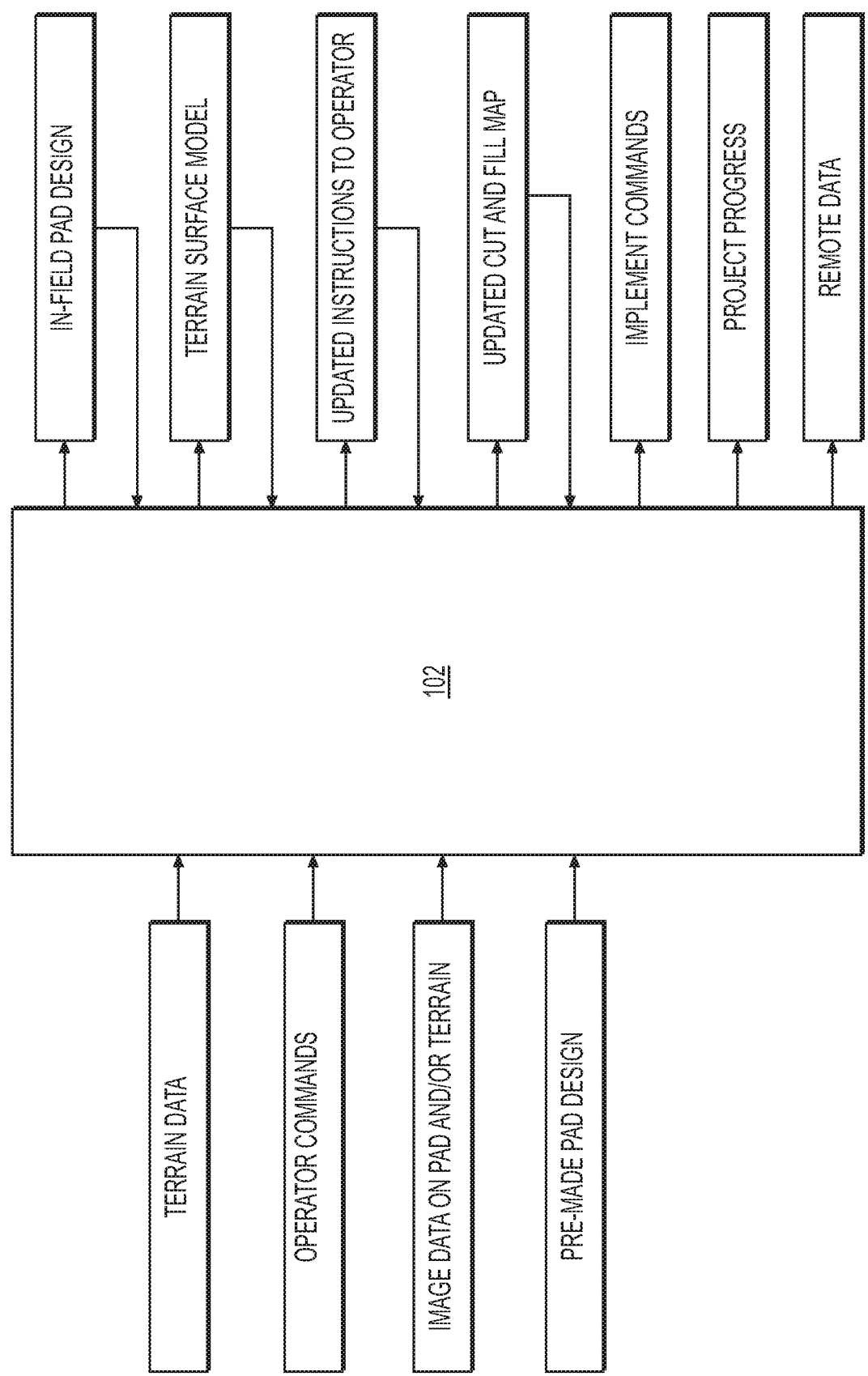
FIG. 4 illustrates exemplary functions of a controller on a geography-altering machine.

FIG. 4 shows exemplary functions of controller 102 on machine 101. For example, information such as terrain data (e.g., image data of terrain), operator commands (e.g., desired thickness of the pad), image data (e.g., real-time updated data) of the pad and/or the terrain, and/or a pre-determined pad design may be entered into controller 102. Controller 102 may process the inputted information and output information such as in-field pad design, terrain surface model, instructions to the operator, cut-and-fill maps, implement commands, project progress, and/or data transmitted to remote device. Some of the outputted information (e.g., instructions to the operator and the cut-and-fill maps) may be re-entered to controller 102 for updating. The operator commands may be from the instructions, e.g., entered to controller 102 based on instructions for performing a cut-and-fill task.

INDUSTRIAL APPLICABILITY

The present disclosure finds potential application in building a pad. The present disclosure enables automating the pad-building process by providing step-by-step guidance to the operator of machine 101 based on three dimensional data of the terrain surface and real-time monitoring of the pad-building process using imaging device 103 on machine 101.

For example, the present disclosure includes a method for building a pad at construction site 105. In such an example, a design for the pad and a terrain surface model of construction site 105 may be received by the machine 101, e.g., by controller 102 input data and image data obtained from imaging device 103. Then based on the pad design and the terrain surface model, a cut-and-fill map may be generated (e.g., by controller 102) for building the pad with desired features in the design based on the shape and the condition of the terrain surface of construction site 105. Guidance to the operator of machine 101 may also be generated (e.g. by controller 102) based on the cut-and-fill map. The guidance may include the starting location of the project, moving directions, routes of the passes of machine 101, types and amount of materials loaded on machine 101, etc. The pad-building process may be monitored by machine 101 using imaging device 103 so that the cut-and-fill map and the guidance are updated real-time. In some cases, the position of implement system 104 on machine 101 may be automatically set based on parameters entered by the operator and/or extracted from the cut-and-fill map.

The systems and methods herein may allow for efficiencies in the pad-building processes. For example, the entire pad-building process could be completed with only machine 101, or alternatively, many of the steps of the pad-building process could be completed only with the machine 101. Further, with the disclosed systems, an operator of machine 101 with little previous pad-building experience or any pre-made maps of the terrain or pad designs, may nonetheless carry out the pad-building process. The systems and methods herein may allow the operator to perform the required tasks by following step-by-step instructions generated real-time on machine 101 while the machine is on the construction site 105. For example, such a system could be used on smaller job sites where extensive planning or pad designing is not available or appropriate. The disclosed system may help reduce the time and expense of the pad building-process, and may help enhance efficiency in performing pad-building projects.

It will be apparent to those skilled in the art that various modifications and variations can be made to the disclosed system without departing from the scope of the disclosure. Other embodiments of the system will be apparent to those skilled in the art from consideration of the specification and practice of the method disclosed herein. It is intended that the specification and examples be considered as exemplary only, with a true scope of the disclosure being indicated by the following claims and their equivalents.

What is claimed is:

1. A method of building a pad at a construction site using a geography-altering machine, the method comprising:
   a. receiving a design for the pad at the geography-altering machine, wherein the design for the pad includes a desired layer thickness of a portion of the pad;

b. receiving a terrain surface model of the construction site at the geography-altering machine, wherein the terrain surface model is generated using an imaging device located on a front of the geography-altering machine;

c. generating a cut-and-fill map at the geography-altering machine based on the design for the pad and the terrain surface model, wherein the cut-and-fill map includes the desired layer thickness of the portion of the pad;

d. generating guidance for building the pad at the geography-altering machine, wherein the guidance includes a starting location, moving directions for the geography-altering machine, routes of one or more passes of the geography-altering machine over the pad, types or amounts of materials on the pad and moved by the geography-altering machine, and a height or a position of an implement of the geography-altering machine for building the portion of the pad to achieve the desired layer thickness of the portion of the pad;

e. monitoring a process of building the pad using the imaging device on the front of the geography-altering machine; and f. updating the cut-and-fill map and the guidance based on the monitored process.

2. The method of claim 1, wherein the design for the pad includes one or more boundaries of the pad, a slope of the pad, or a combination thereof.

3. The method of claim 1, wherein the terrain surface model is a three-dimensional model.

4. The method of claim 1, wherein the imaging device is a stereo camera positioned on the front of the geography-altering machine.

5. The method of claim 1, wherein the cut-and-fill map is generated based on a comparison between the design for the pad and the terrain surface model.

6. The method of claim 1, wherein the cut-and-fill map includes cut volume and fill volume on the construction site.

7. The method of claim 1, wherein the guidance includes routes of multiple passes on the construction site and a sequence of the passes.

8. The method of claim 7, wherein the guidance further includes amounts of material loaded on the geography-altering machine for the multiple passes.

9. The method of claim 1, further comprising displaying the guidance on a user interface.

10. The method of claim 1, wherein the cut-and-fill map and the guidance are updated in real-time, and wherein the updating is based on input received from the imaging device located on the front of the geography-altering machine.

11. The method of claim 1, wherein the updated cut-and-fill map includes an updated location of the geography-altering machine and a percent complete.

12. The method of claim 1, wherein the height or the position of the implement is set based on a parameter entered by a user, the cut-and-fill map, and/or the terrain surface model.

13. The method of claim 1, wherein the geography-altering machine is a track-type tractor, wherein the pad is an oil pad, a building pad, or a residential pad, and wherein building the pad includes re-shaping topography of a plot of land at the construction site by filling and/or cutting materials on a surface of the plot of the land.

14. The method of claim 1, wherein the desired thickness of the portion of the pad is entered by an operator, and wherein the method further includes setting the height of the implement for building the portion of the pad based on the desired thickness of the portion of the pad and the location of the geography-altering machine on the pad.

15. The method of claim 1, wherein the cut-and-fill map and the guidance are updated, based on updated image data from the imaging device, as the geography-altering machine moves on the construction site, wherein the updated image data includes current terrain data of the construction site, and wherein the updated image data includes corresponding machine positioning data associated with a global positioning system located on the geography-altering machine and connected to the imaging device.

16. A method of building a pad at a construction site using a geography-altering machine, the method comprising:

a. receiving a design for the pad and a terrain surface model of the construction site in a controller on the geography-altering machine, wherein the terrain surface model is received from an imaging device positioned on a front of the geography-altering machine, and wherein the design for the pad includes a desired layer thickness of a portion of the pad;

b. generating a cut-and-fill map based on the design for the pad and the terrain surface model by the controller, wherein the cut-and-fill map includes the desired layer thickness of the portion of the pad; and c. generating guidance, by the controller, for building the pad, the guidance including a starting location, moving directions for the geography altering machine, routes of one or more passes of the geography-altering machine over the pad, types or amounts of materials on the pad and moved by the geography-altering machine, and a height or a position of an implement of the geography-altering machine for building the portion of the pad to achieve the desired layer thickness of the portion of the pad, wherein the guidance for building the pad includes guidance for re-shaping topography of a plot of land at the construction site by filling and/or cutting materials on a surface of the plot of the land at the construction site.

17. The method of claim 16, wherein the imaging device is a stereo camera on the front of the geography-altering machine.

18. The method of claim 16, further comprising updating the cut-and-fill map by the controller based on image data received from the imaging device, wherein the updated cut-and-fill map includes an updated location of the geography-altering machine and a percent complete, and
wherein the pad is an oil pad, a building pad, or a residential pad.

19. A geography-altering machine for building a pad at a construction site, comprising:

a. an imaging device positioned on the geography-altering machine; and b. a controller, wherein the controller is configured to:
receive a design for a pad, wherein the design for the pad includes a desired layer thickness of a portion of the pad;
receive a terrain surface model of the construction site, wherein the terrain surface model is received from the imaging device positioned on a front of the geography-altering machine;
generate a cut-and-fill map based on the design for the pad and the terrain surface model, wherein the cut-and-fill map includes the desired layer thickness of the portion of the pad;
generate guidance for building the pad, wherein the guidance is generated by a controller on the geography-altering machine and includes a starting location, moving directions for the geography-altering machine, routes of one or more passes of the geography-altering machine over the pad, types or amounts of materials on the pad and moved by the geography-altering machine, and a height or a position of an implement of the geography-altering machine for building the portion of the pad to achieve the desired layer thickness of the portion of the pad, and wherein the guidance for building the pad includes guidance for re-shaping topography of a plot of land at the construction site by filling and/or cutting materials on a surface of the plot of the land at the construction site;

monitor a process of building the pad using the imaging device on the geography-altering machine; and update the cut-and-fill map and the guidance based on the monitored process.

20. The geography-altering machine of claim 19, wherein the controller is further configured to receive a command from an operator of the geography-altering machine and to set a position of an implement system on the geography-altering machine, and wherein the imaging device is a stereo camera positioned on a front of the geography-altering machine, and wherein the pad is an oil pad, a building pad, or a residential pad.

* * * * *